(12) United States Patent
Yoon et al.

(10) Patent No.: US 11,576,552 B2
(45) Date of Patent: Feb. 14, 2023

(54) DISH WASHER

(71) Applicant: LG Electronics Inc., Seoul (KR)

(72) Inventors: Sangheon Yoon, Seoul (KR);
Changyoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 78 days.

(21) Appl. No.: 16/697,787

(22) Filed: Nov. 27, 2019

(65) Prior Publication Data

US 2020/0163526 A1 May 28, 2020

(30) Foreign Application Priority Data

Nov. 27, 2018 (KR) .......................... 10-2018-0148954

(51) Int. Cl.
*A47L 15/42* (2006.01)
*A47L 15/00* (2006.01)
(Continued)

(52) U.S. Cl.
CPC ....... *A47L 15/4285* (2013.01); *A47L 15/0047* (2013.01); *A47L 15/4214* (2013.01);
(Continued)

(58) Field of Classification Search
CPC ............. A47L 15/4285; A47L 15/4225; A47L 15/4217; A47L 15/4223; A47L 2501/06;
(Continued)

(56) References Cited

U.S. PATENT DOCUMENTS

2011/0290284 A1* 12/2011 Chung ................ A47L 15/4219
134/105
2013/0319458 A1* 12/2013 Lim ........................ A47L 15/13
134/1
(Continued)

FOREIGN PATENT DOCUMENTS

CH          699692          3/2010
CN       102121727 A  *   7/2011
(Continued)

OTHER PUBLICATIONS

Office Action in German Appln. No. 102019131949.8, dated Feb. 2, 2022, 12 pages (with English translation).

*Primary Examiner* — Benjamin L Osterhout
*Assistant Examiner* — Pallavi Chitta
(74) *Attorney, Agent, or Firm* — Fish & Richardson P.C.

(57) ABSTRACT

A dish washer includes: a washing tank including a sump at a bottom surface thereof; a water storage unit disposed inside or outside the washing tank to store washing water to be supplied to the washing tank; a heat pump system including a compressor that compresses and circulates refrigerant, a first heat exchanger disposed in the sump, an expansion apparatus, and a second heat exchanger disposed in the water storage unit to heat washing water for washing the dishes; and a reverse valve that changes a flow of refrigerant flowing through each of the first heat exchanger and the second heat exchanger to allow each of the first heat exchanger and the second heat exchanger to be switched from each other between a heating mode for heating the (Continued)

washing water and a heat recovery mode for recovering heat from washing water discharged to the outside from the washing tank.

20 Claims, 12 Drawing Sheets

(51) Int. Cl.
    *A47L 15/48*         (2006.01)
    *F24H 4/02*         (2022.01)

(52) U.S. Cl.
    CPC ....... *A47L 15/4217* (2013.01); *A47L 15/4223* (2013.01); *A47L 15/4225* (2013.01); *A47L 15/4287* (2013.01); *A47L 15/4291* (2013.01); *A47L 15/483* (2013.01); *F24H 4/02* (2013.01); *A47L 15/4219* (2013.01); *A47L 2401/12* (2013.01); *A47L 2501/06* (2013.01); *A47L 2501/36* (2013.01); *Y02B 30/52* (2013.01); *Y02B 40/00* (2013.01)

(58) Field of Classification Search
    CPC ............. A47L 2501/36; A47L 2401/12; A47L 15/0047; A47L 15/4219; A47L 15/4291; A47L 15/4214; A47L 15/4287; A47L 15/483; A47L 15/4272; A47L 2501/01; Y02B 40/00; Y02B 30/52; F24H 4/02; F25B 30/02; F25B 39/02; F25B 39/04
    See application file for complete search history.

(56) References Cited

U.S. PATENT DOCUMENTS

2016/0324396 A1* 11/2016 Hong ..................... A47L 15/16
2016/0367107 A1* 12/2016 Ellingson ............ A47L 15/0076
2017/0328609 A1* 11/2017 Benedict ............. A47L 15/4287
2018/0028042 A1* 2/2018 Heinle .................... A47L 15/46

FOREIGN PATENT DOCUMENTS

| DE | 102013019185 A1 * | 5/2015 | ........... A47L 15/483 |
|----|----|----|----|
| DE | 102015226481 | 6/2017 | |
| EP | 2682037 | 3/2016 | |

* cited by examiner

DISH WASHER

CROSS-REFERENCE TO RELATED APPLICATION

Pursuant to 35 U.S.C. § 119(a), this application claims the benefit of an earlier filing date of and the right of priority to Korean Patent Application No. 10-2018-0148954, filed on Nov. 27, 2018 the contents of which are incorporated by reference herein in its entirety.

BACKGROUND

1. Technical Field

The present disclosure relates to a dish washer that heats washing water using a heat pump.

2. Description of the Related Art

A dish washer is a device that automatically washes and dries dishes using detergent or the like.

The dish washer may be configured to perform a process of washing, rinsing and drying dishes placed inside a main body thereof.

The dish washer may heat washing water using an electric heater provided in the main body.

However, the electric heater used in the dish washer has a problem that consumes a lot of power when washing and drying dishes.

In addition, high temperature washing water heated subsequent to the completion of washing is discharged to an outside of the dish washer, and thus there is a problem that energy loss occurs.

In order to solve the foregoing problems, a dish washer capable of reducing energy consumption by heating washing water using a heat pump has been developed.

Prior art document EP 2 682 037 B1 (published on Jan. 8, 2014) discloses a dish washer and an operating method thereof. The dish washer in the prior art includes a heat pump system capable of passing outside air (hereinafter, ambient air) through an evaporator to absorb heat as well as exchanging heat with washing water to be supplied to a washing tank from a condenser to heat the washing water.

However, the dish washer in the prior art has a problem that the heated washing water of the washing tank is discharged to the outside to still generate heat loss and have insufficient energy saving.

SUMMARY

The present disclosure has been made to solve the problems in the related art, and an aspect of the present disclosure is to provide a dish washer capable of recovering waste heat from heated washing water subsequent to washing dishes.

In addition, another aspect of the present disclosure is to provide a dish washer capable of preheating washing water in a water storage unit prior to supplying the washing water to a washing tank to reduce washing water heating time.

In order to achieve the foregoing objectives, a dish washer according to an example of the present disclosure may include a washing tank provided with a sump at a bottom surface thereof and provided with an accommodation space for storing dishes therein; a water storage unit disposed inside or outside the washing tank to store washing water to be supplied to the washing tank; a heat pump system provided with a compressor that compresses and circulates refrigerant, a first heat exchanger disposed in the sump, an expansion apparatus, and a second heat exchanger disposed in the water storage unit to heat washing water for washing the dishes; and a reverse valve that changes a flow of refrigerant flowing through each of the first heat exchanger and the second heat exchanger to allow each of the first heat exchanger and the second heat exchanger to be switched from each other between a heating mode for heating the washing water and a heat recovery mode for recovering heat from washing water discharged to the outside from the washing tank.

According to an example of the present disclosure, the refrigerant may be condensed in the first heat exchanger while heating the washing water to release heat to the washing water, and circulated in the order of the expansion apparatus, the second heat exchanger, and the compressor from the first heat exchanger, and evaporated by absorbing heat from the washing water in the first heat exchanger while recovering heat from the washing water, and circulated in the order of the compressor, the second heat exchanger, and the expansion apparatus from the first heat exchanger.

According to an example of the present disclosure, the dish washer may further include a suction port disposed at one side of the water storage unit; a suction fan mounted at the suction port to suction outside air into the water storage unit; and a discharge port disposed at the other side of the water storage unit.

According to an example of the present disclosure, the dish washer may further include a controller that controls the reverse valve to selectively change a flow direction of the refrigerant.

According to an example of the present disclosure, the dish washer may further include a washing water supply unit that supplies washing water to the water storage unit; an inlet pipe that connects the washing water supply unit and the water storage unit; a water inlet valve provided at the inlet pipe to open and close the inlet pipe; a washing water connection pipe that connects the water storage unit and the sump; and an open-close valve that opens and closes the washing water connection pipe.

According to an example of the present disclosure, the second heat exchanger may be configured with a refrigerant pipe defined in a circular pipe shape, and the refrigerant pipe may extend in a zigzag shape.

According to an example of the present disclosure, the dish washer may further include a plurality of guide walls spaced apart from each other inside the water storage unit to guide a flow of outside air suctioned into the water storage unit; and a communication hole disposed at one end portion or the other end portion of each of the plurality of guide walls to guide a flow direction of the outside air in a zigzag shape.

According to an example of the present disclosure, the flow directions of the outside air and the refrigerant moving along the plurality of guide walls may face in opposite directions to each other.

According to an example of the present disclosure, the dish washer may further include a plurality of racks disposed inside the washing tank to store dishes; a plurality of injection arms spaced apart in a vertical direction inside the washing tank, and provided with a plurality of nozzles to inject the washing water toward the dishes; a circulation pump that circulates the washing water discharged from the sump into the plurality of injection arms; and a drain pump that discharges the washing water discharged from the sump to the outside.

According to an example of the present disclosure, the dish washer may further include an electric heater that heats the washing water discharged from the sump to be circulated to the plurality of injection arms.

According to an example of the present disclosure, the dish washer may further include a flow generator that generates a flow in washing water stored inside the water storage unit, wherein the flow generator includes an impeller rotatably mounted inside the water storage unit; and a drive motor that drives the impeller.

According to another example of the present disclosure, there is provided a dish washer, including a washing tank provided with an accommodation space for storing dishes therein and provided with a sump that collects washing water for washing the dishes on a bottom surface thereof; a heat exchanger that heats the washing water collected in the sump or recovers heat from the washing water heated in the sump using refrigerant flowing therein; an expansion apparatus that expands the refrigerant received from the heat exchanger; an evaporator that evaporates the refrigerant received from the expansion apparatus; a compressor that compresses the refrigerant received from the evaporator; a condenser that exchanges heat between the refrigerant received from the compressor and the washing water to be supplied to the washing tank to heat the washing water; and a reverse valve that changes a flow of the refrigerant flowing through the heat exchanger to allow the heat exchanger to heat the washing water or recover heat from the washing water.

According to another example of the present disclosure, the dish washer may further include a water storage unit that stores the washing water to be supplied to the washing tank and accommodates the condenser so as to exchange heat with the washing water; a washing water supply unit that supplies washing water to the water storage unit; and a heat exchange chamber that accommodates the evaporator to transfer heat to the evaporator using a heat transfer fluid.

According to another example of the present disclosure, the dish washer may include a water supply unit that supplies water for transferring heat the evaporator to the heat exchange chamber; a water pipe that connects one side of the heat exchange chamber and the water supply unit to supply the water; a water inlet valve provided at the water pipe to open and close the water pipe; an outlet pipe connected to the other side of the heat exchange chamber to discharge the water; and a water outlet valve provided at the outlet pipe to open and close the outlet pipe.

According to another example of the present disclosure, the dish washer may further include a first temperature sensor provided at the water pipe to sense a temperature of the water; a second temperature sensor provided at an inlet side of the evaporator to sense a refrigerant temperature of the evaporator; and a controller that compares the water with the refrigerant temperature of the inlet side of the evaporator to control the water inlet valve and the water outlet valve according to the temperature of the water.

According to another example of the present disclosure, the dish washer may further include a first flow generator that generates a flow in washing water stored inside the water storage unit; and a second flow generator that generates a flow in water stored inside the heat exchange chamber.

According to another example of the present disclosure, each of the first flow generator and the second flow generator may include an impeller rotatably mounted inside the heat exchange chamber; and a drive motor that drives the impeller.

According to another example of the present disclosure, the dish washer may further include a three-way valve provided at a branch point of a refrigerant circulation pipe branched from the expansion apparatus to the heat exchanger and the evaporator to switch a direction of the refrigerant.

According to another example of the present disclosure, the dish washer may further include a plurality of racks disposed inside the washing tank to store the dishes; a plurality of injection arms spaced apart in a vertical direction inside the washing tank, and provided with a plurality of nozzles to inject the washing water toward the dishes; a circulation pump that circulates the washing water discharged from the sump into the plurality of injection arms; and a drain pump that discharges the washing water discharged from the sump to the outside.

According to another example of the present disclosure, the dish washer may further include an electric heater that heats the washing water discharged from the sump to be circulated to the plurality of injection arms.

The effects of a dish washer having a heat pump according to the present disclosure will be described as follows.

First, a reverse valve may change a flow direction of refrigerant flowing through each of a first heat exchanger and a second heat exchanger to allow the first heat exchanger to heat washing water in a heating mode of the heat pump so that the first heat exchanger disposed in a sump and the second heat exchanger disposed in a water storage unit exchange the roles of a condenser and an evaporator in a heating mode and a heat recovery mode. In addition, in the heat recovery mode of the heat pump, the first heat exchanger may recover waste heat to be discarded to the outside from the heated washing water to save energy, and the second heat exchanger may receive the heat recovered from the first heat exchanger to heat washing water stored in a water storage unit, thereby reducing washing water heating time.

Second, an electric heater may be disposed at a downstream side of a circulation pump, so that the first heat exchanger (heating mode) disposed in a sump primarily heats washing water collected in the sump, and then the electric heater secondarily heats washing water circulated by the circulation pump, thereby reducing washing water heating time.

Third, a flow generator may be provided with an impeller rotatably mounted in the water storage unit to generate a flow in the washing water of the water storage unit so as to more actively carry out heat exchange between washing water stored in the water storage unit and refrigerant in the second heat exchanger, thereby increasing the condensation temperature of the refrigerant in the second heat exchanger to reduce washing water heating time.

DETAILED DESCRIPTION OF THE EMBODIMENTS

Figure 1:
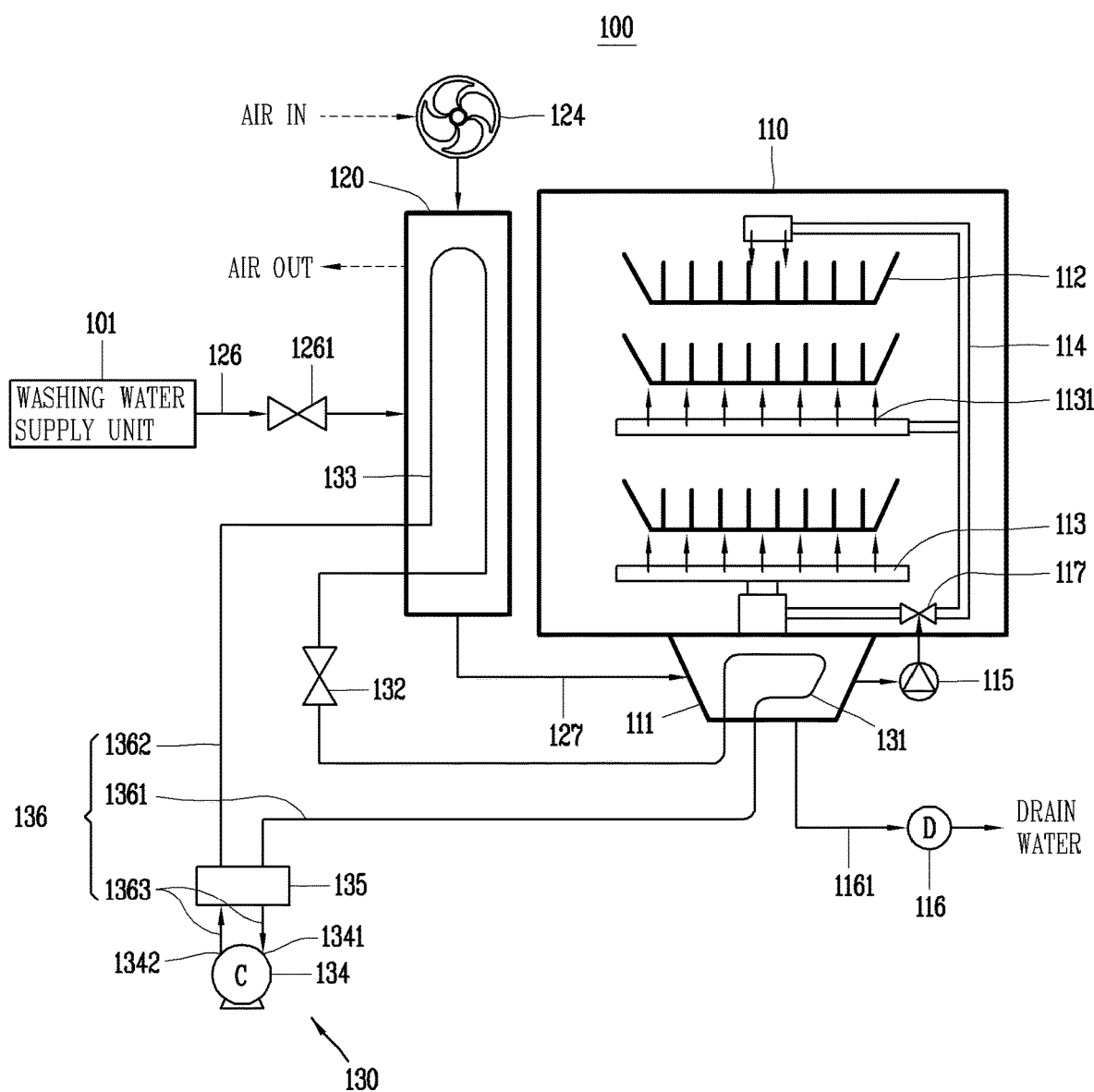
FIG. 1 is a conceptual view showing a dish washer to which a washing water heating and heat recovery system using a mode change in a heat pump according to a first embodiment of the present disclosure is applied.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the embodiments disclosed herein, moreover, the detailed description will be omitted when specific description for publicly known technologies to which the invention pertains is judged to obscure the gist of the present disclosure. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Figure 2:
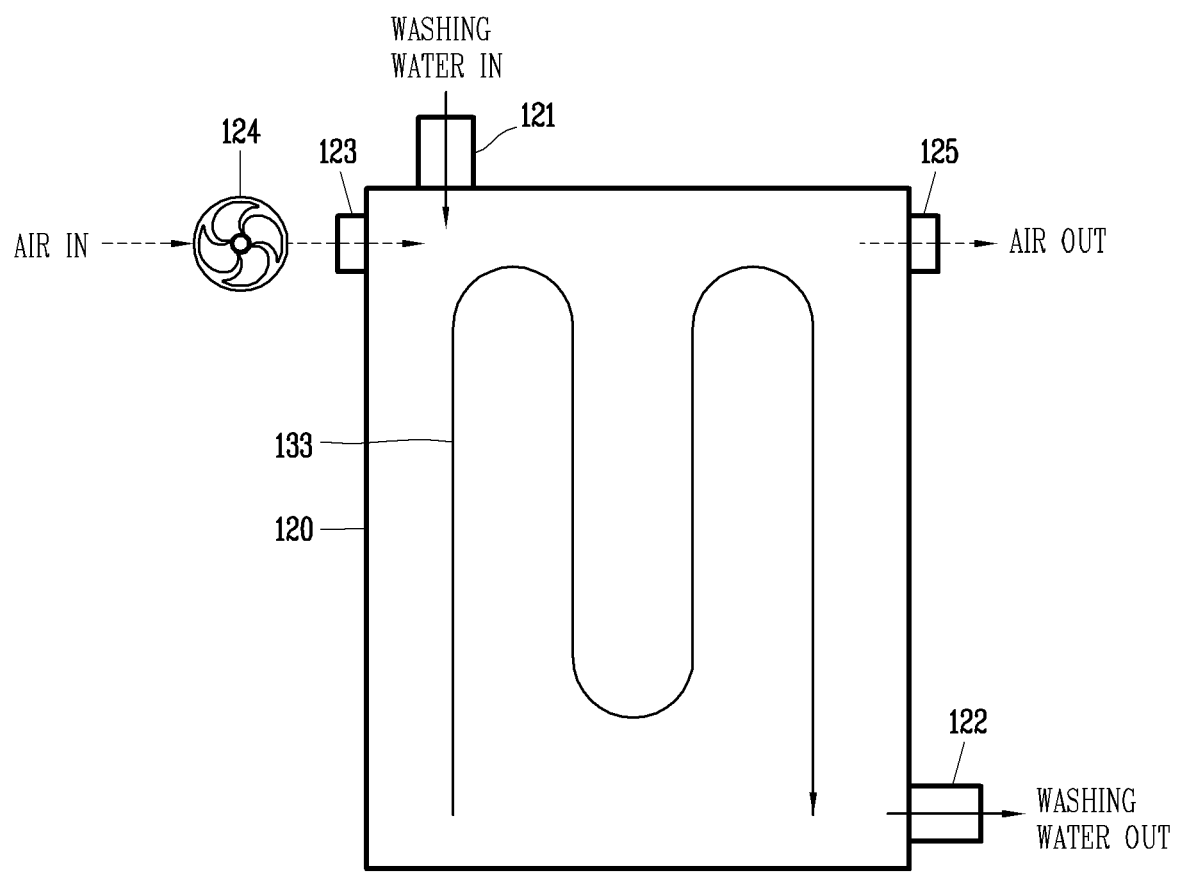
FIG. 2 is a conceptual view showing a state in which outside air is suctioned into a water storage unit by a suction fan in FIG. 1.
Figure 3:
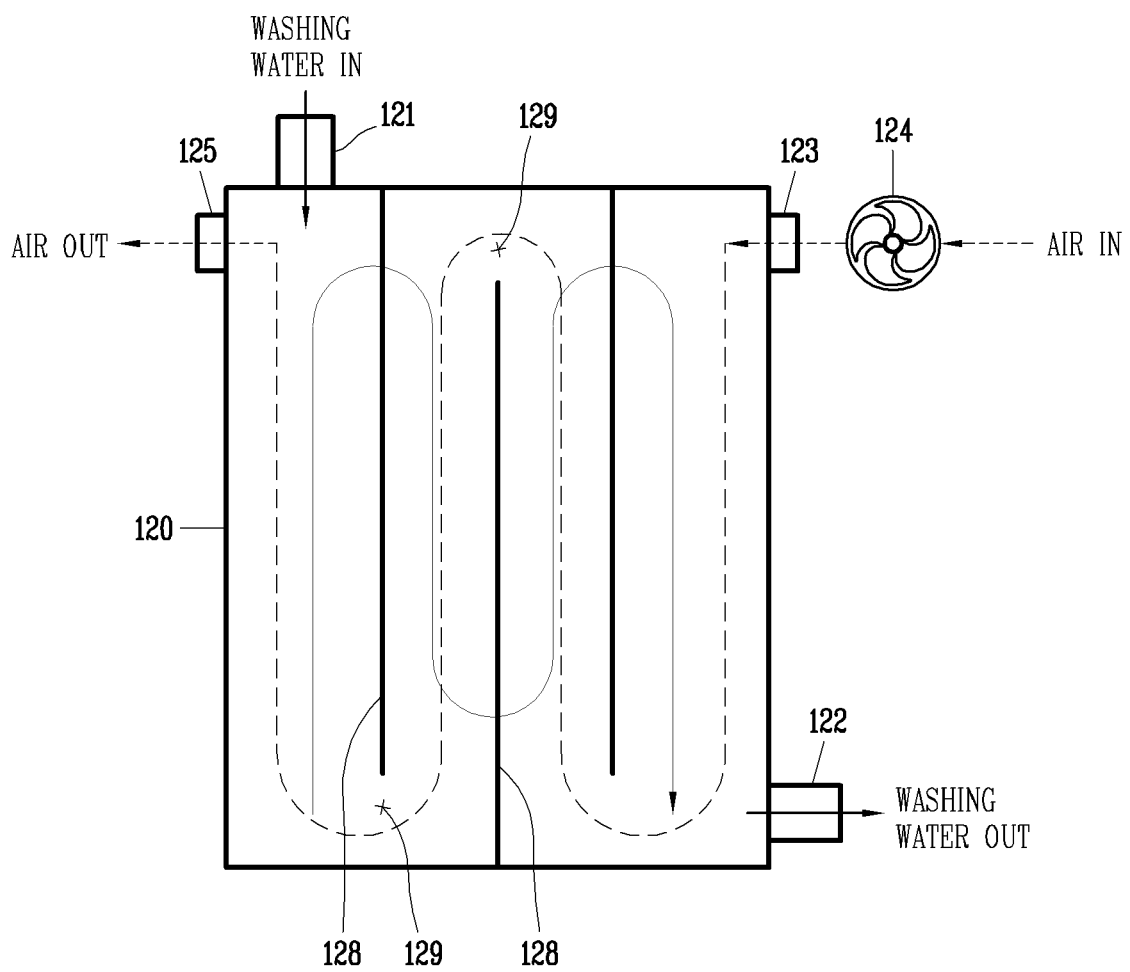
FIG. 3 is a conceptual view showing a state in which a plurality of guide walls are arranged in FIG. 2.

FIG. 1 is a conceptual view showing a dish washer 100 to which a washing water heating and heat recovery system using a mode change in a heat pump according to a first embodiment of the present disclosure is applied, and FIG. 2 is a conceptual view showing a state in which outside air is suctioned into a water storage unit 120 by a suction fan 124 in FIG. 1, and FIG. 3 is a conceptual view showing a state in which a plurality of guide walls 128 are arranged in FIG. 2.

The dish washer 100 includes a washing tank 110 and a heat pump system 130.

The washing tank 110 may include an accommodation space for accommodating dishes therein. A plurality of racks 112 are provided in the washing tank 110 to store dishes. The plurality of racks 112 may be arranged to be vertically spaced apart in a height direction of the washing tank 110. Each of the plurality of racks 112 may be provided with a plurality of holders to set up tableware such as plates, dishes or the like in an inclined manner.

The washing tank 110 may be provided inside the cabinet. The cabinet may define an appearance of the dish washer 100.

A dish inlet port is formed at a front side of the cabinet, and a door is rotatably mounted at the front side of the cabinet to open and close the dish inlet port. A front side of the washing tank 110 may be open to communicate with the dish inlet port of the cabinet.

According to this configuration, dishes may be put into the washing tank 110 through the dish inlet port, and stored in the racks 112.

A plurality of injection arms 113 are provided inside the washing tank 110. The plurality of injection arms 113 may be disposed between the racks 112. The plurality of injection arms 113 may be spaced apart from one another at upper, middle and lower portions of the accommodation space of the washing tank 110.

A plurality of nozzles 1131 may be spaced apart in a length direction on each of the plurality of injection arms 113. A passage may be disposed to allow washing water to flow into each of the plurality of injection arms 113.

One side of the plurality of nozzles 1131 may be connected to communicate with the passage of the injection arm 113, and the other side thereof is open toward the racks 112.

According to this configuration, washing water may move along the passage of the injection arm 113 and may be distributed to the plurality of nozzles 1131, and may be injected onto dishes through the plurality of nozzles 1131.

A sump 111 is disposed to be recessed downward on a bottom surface of the washing tank 110, and washing water is injected onto the dishes and then collected in the sump 111.

A washing water supply unit 101 may be configured to supply washing water to the washing tank 110. The washing water supply unit 101 is implemented as a faucet disposed at an end portion of the water pipe to supply tap water.

A water storage unit 120 may be disposed inside or outside the washing tank 110 to store washing water in the water storage unit 120. The water storage unit 120 may be integrally disposed inside or outside the washing tank 110. Alternatively, the water storage unit 120 may be spaced apart from the washing tank 110 to deliver the washing water to the washing tank 110.

A water inlet 121, a water outlet 122, a suction port 123, and a discharge port 125 may be provided in the water storage unit 120.

The water inlet 121 is disposed at an upper portion of the water storage unit 120 to receive washing water through the water inlet 121. The water outlet 122 is disposed at a lower portion of the water storage unit 120 to discharge washing water through the water outlet 122.

One side of an inlet pipe 126 is connected to the washing water supply unit 101, and the other side thereof is connected to the water inlet 121 to flow washing water into the water inlet 121 while moving along the inlet pipe 126.

One side of the washing water connection pipe 127 is connected to the water outlet 122, and the other side thereof is connected to the sump 111 of the washing tank 110 to transfer washing water into the washing tank 110 from the water storage unit 120.

The suction port 123 may be disposed at an upper side of the water storage unit 120, and a suction fan 124 may be mounted at the suction port 123. The suction fan 124 may be driven by a fan driving motor to suction outside air (ambient air) into the water storage unit 120 through the suction port 123.

The discharge port 125 is disposed at an upper portion of the other side of the water supply storage unit 120 to discharge outside air to the outside from the water supply storage unit 120 through the discharge port 125.

The sump 111 is formed on a bottom surface of the washing tank 110 to collect washing water inside the washing tank 110 in the sump 111.

A circulation pump 115 may be provided inside the cabinet to circulate washing water along a circulation passage.

For example, the circulation pump 115 may be provided at the circulation pipe 114 that defines the circulation passage.

One side of the circulation pipe 114 is connected to the sump 111, and the other side of the circulation pipe 114 is connected to a plurality of injection arms 113 to circulate washing water driven by the power of the circulation pump 115 along the circulation pipe 114 from the sump 111 to the plurality of injection arms 113.

A plurality of branch pipes for dispensing washing water to the plurality of injection arms 113 may be disposed at the other side of the circulation pipe 114. The branch pipes may be disposed inside the washing tank 110. A direction switching valve may be provided at a branch portion where washing water is branched into the branch pipe, thereby selectively dispensing the washing water.

A drain pump 116 may be provided inside the cabinet to discharge washing water collected in the sump 111 to the outside. The drain pump 116 may be provided at the drain pipe 1161. One side of the drain pipe 1161 may be connected to the sump 111, and the other side of the drain pipe 1161 may be connected to communicate with the outside.

A first heat exchanger 131 may be accommodated in the sump 111, and thus the first heat exchanger 131 may be configured to heat washing water collected in the sump 111.

The first heat exchanger 131 may be implemented as a refrigerant pipe defined in a circular pipe shape. The refrigerant pipe may be configured to extend in the form of a coil so as to allow refrigerant to flow into the coolant pipe.

The first heat exchanger 131 may be configured to exchange heat between refrigerant and washing water.

The first heat exchanger 131 may be configured to be switchable to a heating mode and a heat recovery mode.

The heating mode is a mode for heating washing water, and the heat recovery mode is a mode for recovering heat from washing water.

The first heat exchanger 131 may be configured to heat washing water by dissipating heat from refrigerant to the washing water in the heating mode, or to cool washing water by absorbing and recovering heat from the washing water to the refrigerant in the heat recovery mode.

A second heat exchanger 133 may be provided to be accommodated in the water storage unit 120. The second heat exchanger 133 may be configured as a refrigerant pipe in a circular pipe form extending in a zigzag shape or serpentine shape. Refrigerant flows into the refrigerant pipe of the second heat exchanger 133 to exchange heat with washing water or outside air stored in the water storage unit 120.

The second heat exchanger 133 may be configured to be switchable to a heating mode for heating washing water and a heat recovery mode for recovering heat from washing water.

The second heat exchanger 133 may heat washing water by dissipating heat from refrigerant to the washing water in the heating mode, or cool washing water by absorbing and recovering heat from the washing water to the refrigerant in the heat recovery mode.

A heat pump system 130 may be provided in the cabinet. The heat pump system 130 may include a compressor 134, a condenser, an expansion apparatus 132, and an evaporator. A refrigerant circulation pipe 136 connects the compressor 134, the condenser, the expansion apparatus 132 and the evaporator in the form of a closed loop to allow refrigerant to move along the refrigerant circulation pipe 136 and circulate through the compressor 134, the condenser, the expansion apparatus 132 and the evaporator.

The compressor 134 may be configured to compress refrigerant. The compressor 134 may be driven by an inverter to adjust rpm and a discharge amount of refrigerant. The compressor 134 may provide circulating power to refrigerant.

The condenser may be configured to condense the refrigerant. The condenser may heat washing water through heat exchange with the washing water.

The expansion apparatus 132 may be configured to expand the refrigerant at low temperature and low pressure. The expansion apparatus 132 may be implemented by a capillary tube or an electronic expansion valve.

The evaporator may be configured to evaporate the refrigerant. The evaporator may absorb and recover heat from washing water through heat exchange with the washing water to cool the washing water.

Each of the first heat exchanger 131 and the second heat exchanger 133 may be configured to be mutually switchable to the function of the condenser or the evaporator of the heat pump system 130.

For example, when the first heat exchanger 131 defines a condenser, the second heat exchanger 133 may be configured to define an evaporator.

Conversely, when the first heat exchanger 131 defines an evaporator, the second heat exchanger 133 may be configured to define a condenser.

To this end, a reverse valve 135 may be configured to change the flow direction of refrigerant flowing through each of the first heat exchanger 131 and the second heat exchanger 133.

The reverse valve 135 may be provided at one side of the refrigerant circulation pipe 136. Each of the first heat exchanger 131 and the second heat exchanger 133 is not directly connected to the compressor 134 by the refrigerant circulation pipe 136, but may be connected to the compressor 134 with the reverse valve 135 interposed therebetween.

The refrigerant circulation pipe 136 may include a first refrigerant circulation pipe 1361 connecting the first heat exchanger 131 and the reverse valve 135, and a second refrigerant circulation pipe 1362 connecting the second heat exchanger 133 and the reverse valve 135, and a plurality of third refrigerant circulation pipes 1363 connecting the compressor 134 and the reverse valve 135.

One third refrigerant circulation pipe 1363 of the plurality of third refrigerant circulation pipes 1363 is configured to connect a refrigerant inlet port 1341 of the compressor 134 and the reverse valve 135, and the other third refrigerant circulation pipe 1363 may be configured to connect a refrigerant discharge port 1342 of the compressor 134 and the reverse valve 135.

The reverse valve 135 may be configured to connect the inlet port 1341 of the compressor 134 to the first heat exchanger 131 and the outlet port 1342 of the compressor 134 to the second heat exchanger 133.

According to this, the first heat exchanger 131 is connected to the inlet port 1341 of the compressor 134 to move refrigerant from the first heat exchanger 131 to the compressor 134 by a suction pressure of the compressor 134 so as to serve as an evaporator. The first heat exchanger 131 may perform a heat recovery mode.

In addition, the second heat exchanger 133 is connected to the outlet port 1342 of the compressor 134 to move refrigerant from the compressor 134 to the second heat exchanger 133 by a discharge pressure of the compressor 134 so as to server as a condenser Referring to FIG. 3, a plurality of guide walls 128 may be provided inside the water storage unit 120.

Each of the plurality of guide walls 128 may extend in a vertical direction. The plurality of guide walls 128 may be spaced apart in a transverse direction of the water storage unit 120. A communication hole 129 may be formed in each of the plurality of guide walls 128 to be spaced apart alternately in a vertical direction.

For example, one communication hole 129 of the plurality of communication holes 129 is disposed at a lower end portion of the first guide wall 128 toward the discharge port 125 in the suction port 123, and then other communication hole 129 may be disposed at an upper end portion of the second guide wall 128, and then disposed at a lower end portion of another guide wall 128.

Outside air suctioned through the suction port 123 moves in a zigzag shape along the guide wall 128 in a vertical direction inside the water storage unit 120, and the outside air may transfer heat to the second heat exchanger 133 while exchanging heat with the refrigerant of the second heat exchanger 133.

The suction port 123 and a refrigerant inlet of the second heat exchanger 133 may be disposed to face each other. The discharge port 125 and a refrigerant outlet of the second heat exchanger 133 may be disposed to face each other.

The suction port 123 and the water inlet 121 of the water storage unit 120 may be disposed to face each other, and the discharge port 125 and the water outlet 122 of the water storage unit 120 may be disposed to face each other.

According to this configuration, the plurality of communication holes 129 are spaced apart in a zigzag shape in a vertical direction in the plurality of guide walls 128 to move outside air in a zigzag shape through the communication holes 129 along the guide walls 128, thereby improving a heat exchange efficiency between the outside air and the refrigerant of the second heat exchanger 133.

Therefore, according to the present disclosure, the reverse valve 135 may change a flow direction of refrigerant flowing through each of the first heat exchanger 131 and the second heat exchanger 133 to allow the first heat exchanger 131 to heat washing water in the heating mode of the heat pump so that the first heat exchanger 131 disposed in the sump 111 and the second heat exchanger 133 disposed in the water storage unit 120 exchange the roles of the condenser and the evaporator in the heating mode and the heat recovery mode.

In addition, in the heat recovery mode of the heat pump, the first heat exchanger 131 may recover the waste heat to be discarded from the heated washing water to save energy, and the second heat exchanger 133 may receive the heat recovered from the first heat exchanger 131 to heat washing water stored in a water storage unit 120, thereby reducing washing water heating time.

Figure 4:
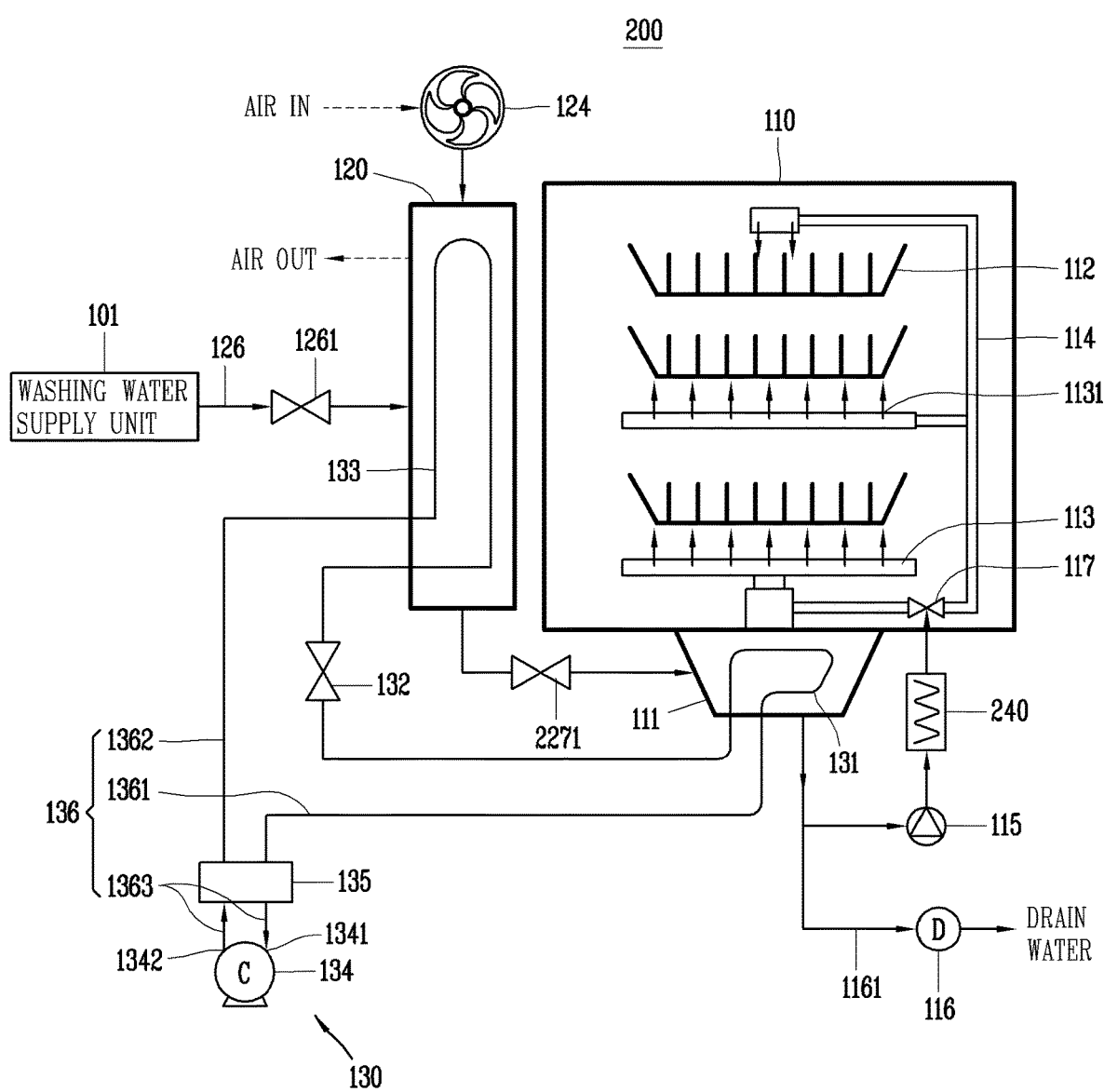
FIG. 4 is a conceptual view showing a dish washer to which a washing water heating and heat recovery system using a mode change of a heat pump according to a second embodiment of the present disclosure is applied.

FIG. 4 is a conceptual view showing a dish washer 200 to which a washing water heating and heat recovery system using a mode change of a heat pump according to a second embodiment of the present disclosure is applied.

The present embodiment is different from the first embodiment in that an electric heater 240 is additionally applied thereto.

An open-close valve 2271 may be selectively applied to the washing water connection pipe 127. In the present embodiment, the open-close valve 2271 is provided in the washing water connection pipe 127 to open and close the washing water connection pipe 127.

The electric heater 240 has a heating coil therein, and when power is applied to the heating coil, the electric heater 240 generates thermal energy to heat washing water passing through the electric heater 240.

The electric heater 240 may be provided in the circulation pipe 114. The electric heater 240 may be disposed at a downstream side of the circulation pump 115, and may be heated by the electric heater 240 prior to distributing washing water discharged from the circulation pump 115 to the injection arm 113.

According to this configuration, the first heat exchanger 131 may primarily heat washing water collected in the sump 111, and then the electric heater 240 may secondarily heat the primarily heated washing water, thereby reducing washing water heating time.

Since other components are the same as or similar to those of the first embodiment, their duplicated descriptions will be omitted.

Figure 5:
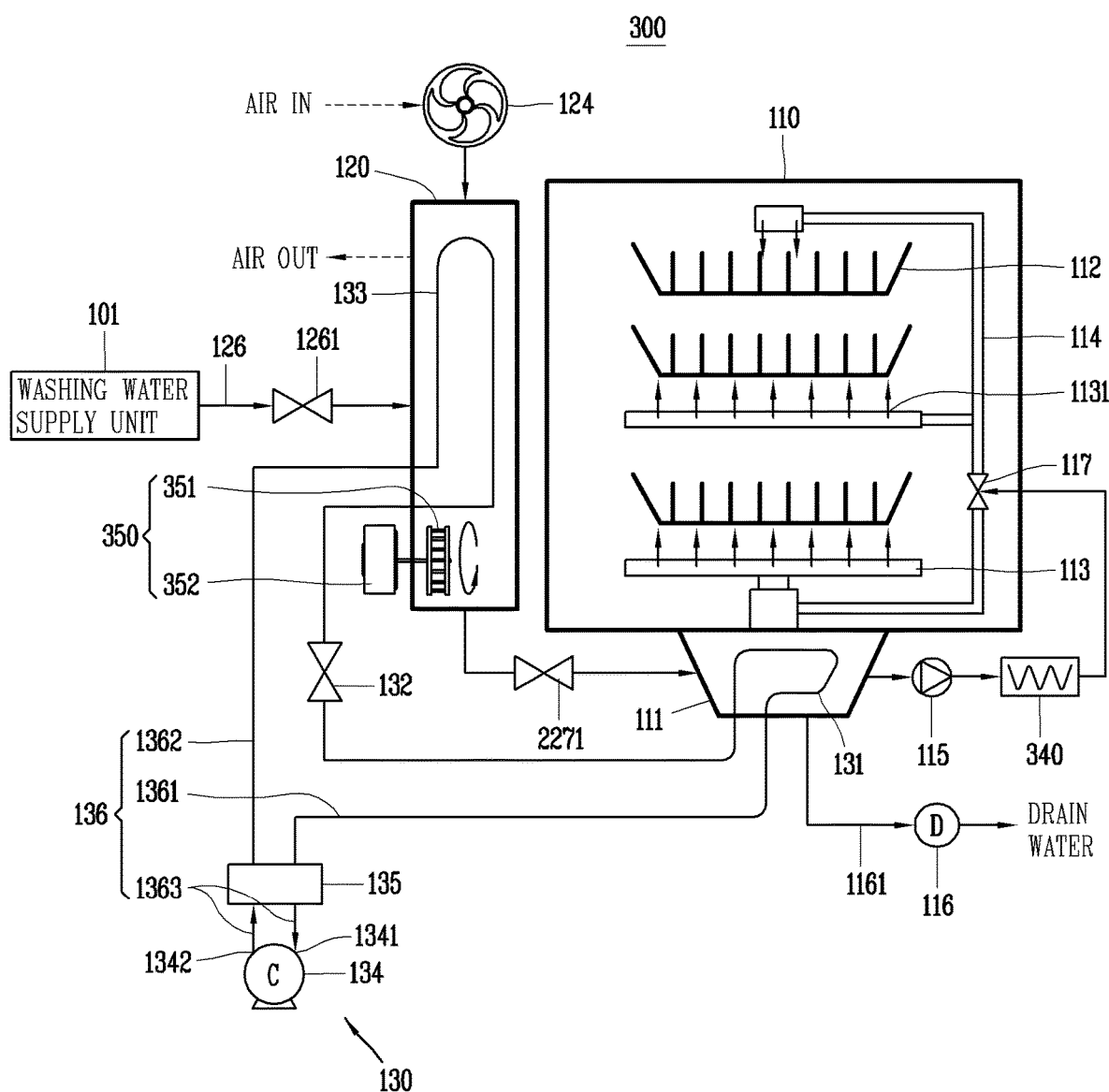
FIG. 5 is a conceptual view showing a dish washer to which a washing water heating and heat recovery system using a mode change in a heat pump according to a third embodiment of the present disclosure is applied.

FIG. 5 is a conceptual view showing a dish washer 300 to which a washing water heating and heat recovery system using a mode change of a heat pump according to a third embodiment of the present disclosure is applied.

The present embodiment differs from the first embodiment in that an electric heater 340 and a flow generator 350 are further included. However, since the electric heater 340 is the same as or similar to that of the second embodiment, the description of the electric heater 340 will be replaced with the second embodiment.

The flow generator 350 may be configured to generate a flow in the washing water of the water storage unit 120. The flow generator 350 may include an impeller 351 and a drive motor 352. The impeller 351 may be rotatably mounted inside the water storage unit 120.

The drive motor 352 may be connected to the impeller 351 through a rotary shaft to drive the impeller 351.

According to this configuration, heat exchange is more actively carried out between washing water stored in the water storage unit 120 and the refrigerant of the second heat exchanger 133 to increase the condensation temperature of the refrigerant of the second heat exchanger 133, thereby reducing the heating time of washing water.

Figure 6:
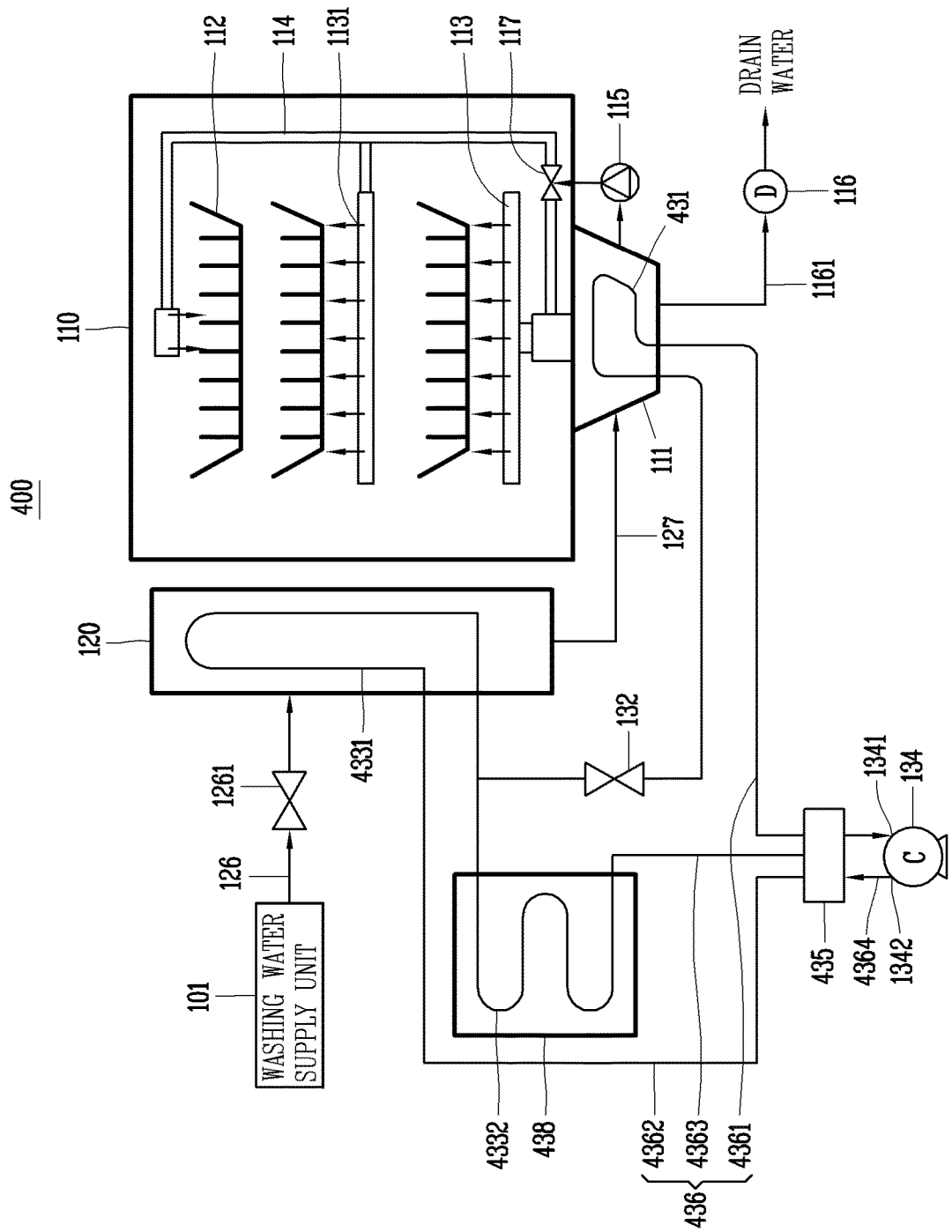
FIG. 6 is a conceptual view showing a dish washer to which a washing water heating and heat recovery system using a mode change in a heat pump according to a fourth embodiment of the present disclosure is applied.
Figure 7:
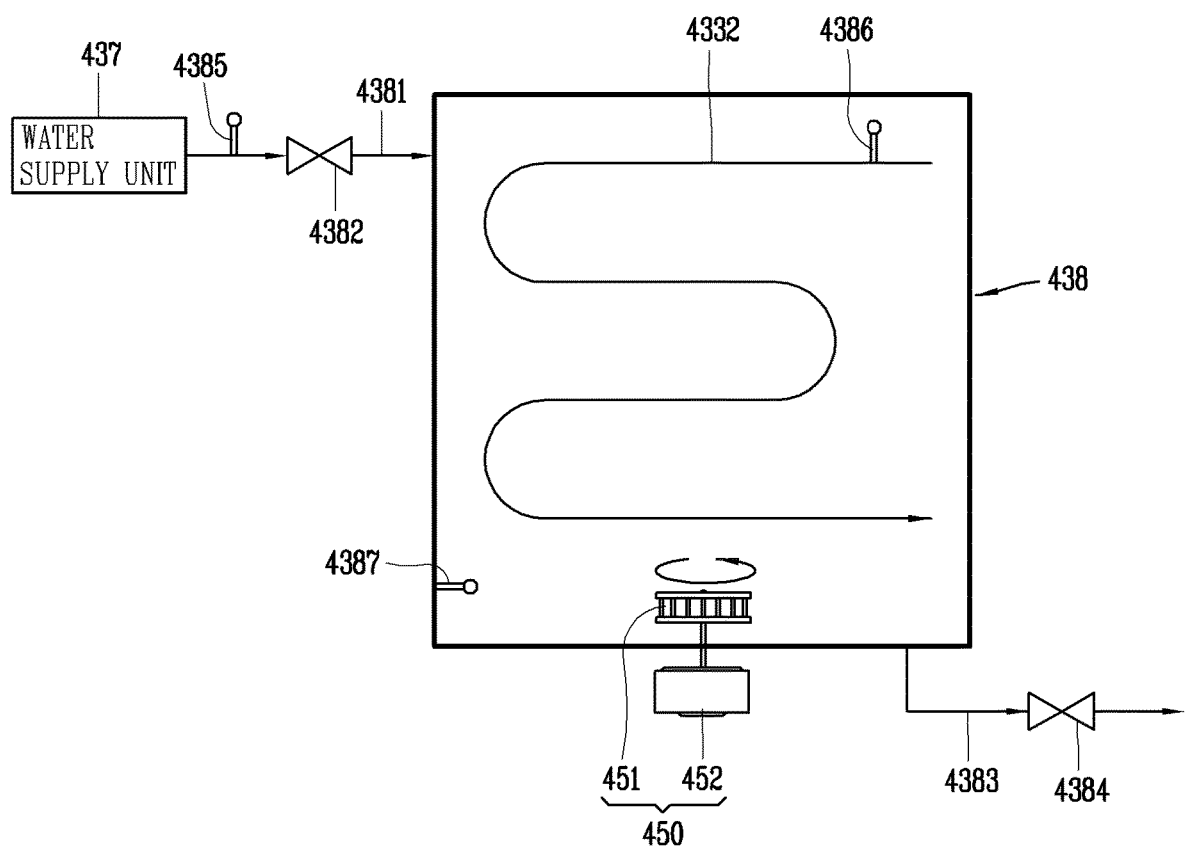
FIG. 7 is a conceptual view showing a state in which a flow generator and a temperature sensor are applied to a water storage unit in FIG. 6.

FIG. 6 is a conceptual view showing a dish washer 400 to which a washing water heating and heat recovery system using a mode change in a heat pump according to a fourth embodiment of the present disclosure is applied, and FIG. 7 is a conceptual view showing a state in which a flow generator 450 and a temperature sensor are applied to the water storage unit 120 in FIG. 6.

The present embodiment differs from the first embodiment in that instead of the second heat exchanger 133 of the first embodiment, a condenser 4331 is disposed inside the water storage unit 120, and an evaporator 4332 is disposed inside a heat exchange chamber 438. However, in the present embodiment, the heat exchanger 431 may replace the first heat exchanger 131 according to the first embodiment. In the water storage unit 120 of the present embodiment, the suction port 123, the discharge port 125, and the suction fan 124 of the first embodiment may be deleted.

Since other components are the same as or similar to those of the first embodiment, their duplicated descriptions will be omitted and descriptions will be given based on differences.

The heat exchange chamber 438 may be provided inside the cabinet separately from the water storage unit 120. The heat exchange chamber 438 may accommodate the evaporator 4332. The heat exchange chamber 438 may accommodate a heat transfer fluid. The heat transfer fluid may be water or outside air. In the present embodiment, the heat transfer fluid is water.

A circulation pipe 436 may be configured with a first circulation pipe 4361 through a fourth circulation pipe 4344.

A plurality of circulation pipes may be provided such that the first circulation pipe 4361 connects the heat exchanger 431 with the reverse valve 435, the second circulation pipe 4362 connects the evaporator 4332 with the reverse valve 435, the third circulation pipe 4363 connects the condenser 4331 with the reverse valve 435, and the fourth circulation pipe 4364 connects the compressor 134 with the reverse valve 435.

One fourth circulation pipe 4264 of the plurality of fourth circulation pipes 4344 may be connected to the refrigerant inlet port 1341 of the compressor 134, and another fourth circulation pipe 4344 may be connected to the refrigerant outlet port 1342 of the compressor 134.

According to this configuration, the reverse valve 435 may block the refrigerant flow of the third circulation pipe 4363 in the heating mode to allow refrigerant to circulate through the compressor 134, the heat exchanger 431, the expansion apparatus 132 and the evaporator 4332, and the heat exchanger 431 may heat washing water collected in the sump 111.

The reverse valve 435 may block the refrigerant flow of the second circulation pipe 4362 in the heat recovery mode to allow refrigerant to circulate through the compressor 134, condenser 4331, the expansion apparatus 132 and the heat exchanger 431, and the heat exchanger 431 may recover heat from washing water to be discharged from the sump 111 subsequent to the completion of washing.

According to this configuration, the heat exchanger 431 disposed in the sump 111 may switch the roles of the condenser 4331 and the evaporator 4332 according to the heating mode and the heat recovery mode, and the heat exchanger 431 may heat washing water in the heating mode of the heat pump to selectively operate the condenser 4331 disposed in the water storage unit 120 and the evaporator 4332 disposed in the heat exchange chamber 438, and the evaporator may receive heat from water stored in the heat exchange chamber 438. In the heating mode, the condenser 4331 disposed in the water storage unit 120 does not exchange heat with the washing water of the water storage unit 120.

In addition, in the heat recovery mode of the heat pump, the heat exchanger 431 may recover the waste heat to be discarded from the heated washing water to save energy, and the condenser 4331 may receive the heat recovered from the heat exchanger 431 to heat washing water stored in a water storage unit 120, thereby reducing washing water heating time.

Referring to FIG. 7, water may be supplied from the water supply unit 437 to the heat exchange chamber 438. The water supply unit 437 may be provided separately from the washing water supply unit 101, or the washing water supply unit 101 and the heat exchange chamber 438 may be connected to provide water to the heat exchange chamber 438 from the washing water supply unit 101.

In the present embodiment, it is shown an example in which the water supply unit 437 is provided separately from the washing water supply unit 101.

An inlet pipe 4381 may be connected in communication between the water supply unit 437 and the heat exchange chamber 438 to provide water for heat transfer to the heat exchange chamber 438 from the water supply unit 437. An outlet pipe 4383 is connected to a water outlet of the heat exchange chamber 438 to discharge water through the outlet pipe 4383.

The flow generator 450 may be provided in the heat exchange chamber 438. The flow generator 450 may include an impeller 351 and a drive motor 352. The impeller 351 may be rotatably provided in the heat exchange chamber 438 to increase heat exchange efficiency by generating a flow in water.

A water inlet valve 4382 may be provided in the inlet pipe 4381 to open and close the inlet pipe 4381.

A water outlet valve 4384 may be provided in the outlet pipe 4383 to open and close the outlet pipe 4383.

A first temperature sensor 4385 may be provided in the inlet pipe 4381, and a second temperature sensor 4386 may be provided in a refrigerant inlet side of the evaporator 4332. The first temperature sensor 4185 may sense a temperature of water flowing in through the water inlet pipe 4451.

The second temperature sensor 4386 may sense a refrigerant inlet temperature of the evaporator 4332 at an inlet side of the evaporator 4332.

A third temperature sensor 4387 may be provided inside the heat exchange chamber 438 to sense a temperature of water stored in the heat exchange chamber 438.

A controller may receive a sensing signal from the first temperature sensor 4385 and the second temperature sensor 4386 to compare a temperature of water to be introduced into the heat exchange chamber 438 with a refrigerant inlet temperature of the evaporator 4332 so as to control the water inlet valve 4382 and the water outlet valve 4384.

When the temperature of water is higher than the refrigerant inlet temperature of the evaporator 4332, the controller may open the water inlet valve 4382 to supply water to the heat exchange chamber 438 so as to transfer heat from the water to the evaporator 4332.

When the temperature of water is lower than or equal to the refrigerant inlet temperature of the evaporator 4332, the controller may close the water inlet valve 4382.

The controller may replace the water of the heat exchange chamber 438 with new water when the temperature of water stored in the heat exchange chamber 438 is lower than or equal to the refrigerant inlet temperature of the evaporator 4332.

Figure 8:
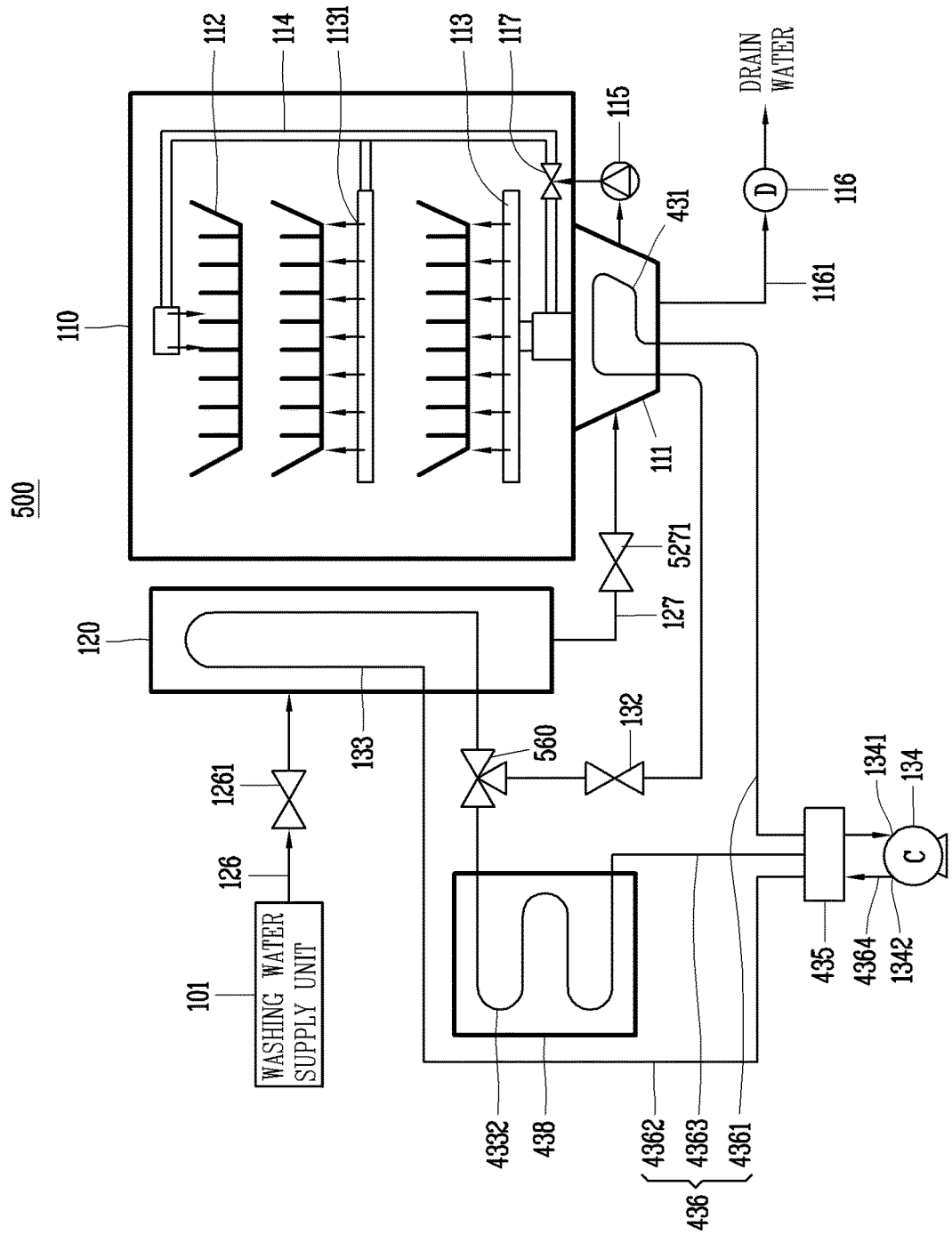
FIG. 8 is a conceptual view showing a dish washer to which a washing water heating and heat recovery system using a mode change in a heat pump according to a fifth embodiment of the present disclosure is applied.

FIG. 8 is a conceptual view showing a dish washer 500 to which a washing water heating and heat recovery system using a mode change of a heat pump according to a fifth embodiment of the present disclosure is applied.

The present embodiment is different from the fourth embodiment in that a three-way valve 560 is provided at a branch portion branched from the expansion apparatus 132 to the condenser 4331 and the evaporator 4332. Since other components are the same as or similar to those of the fourth embodiment, their duplicated descriptions will be omitted.

An open-close valve 5271 may be selectively applied to the washing water connection pipe 127. In the present embodiment, an open-close valve 5271 is provided in the washing water connection pipe 127 to open and close the washing water connection pipe 127.

The three-way valve 560 may be configured to switch the flow of refrigerant at the branch portion.

For example, in the heating mode in which the heat exchanger 431 heats washing water collected in the sump 111, it may be configured such that the three-way valve 560 opens the connection path between the expansion apparatus 132 and the evaporator 4332, thereby expanding the expansion apparatus 132. The refrigerant expanded at) may be configured to move to the evaporator 4332 without moving from the branch to the condenser 4431.

In the heat recovery mode in which the heat exchanger 431 recovers heat from the washing water discharged from the sump 111 to the outside, the three-way valve 560 opens a connection pipeline between the expansion apparatus 132 and the condenser 4331 to move refrigerant condensed in the condenser 4331 to the heat exchanger 431 via the expansion apparatus 132 without moving to the evaporator 4332 from the branch portion.

Figure 9:
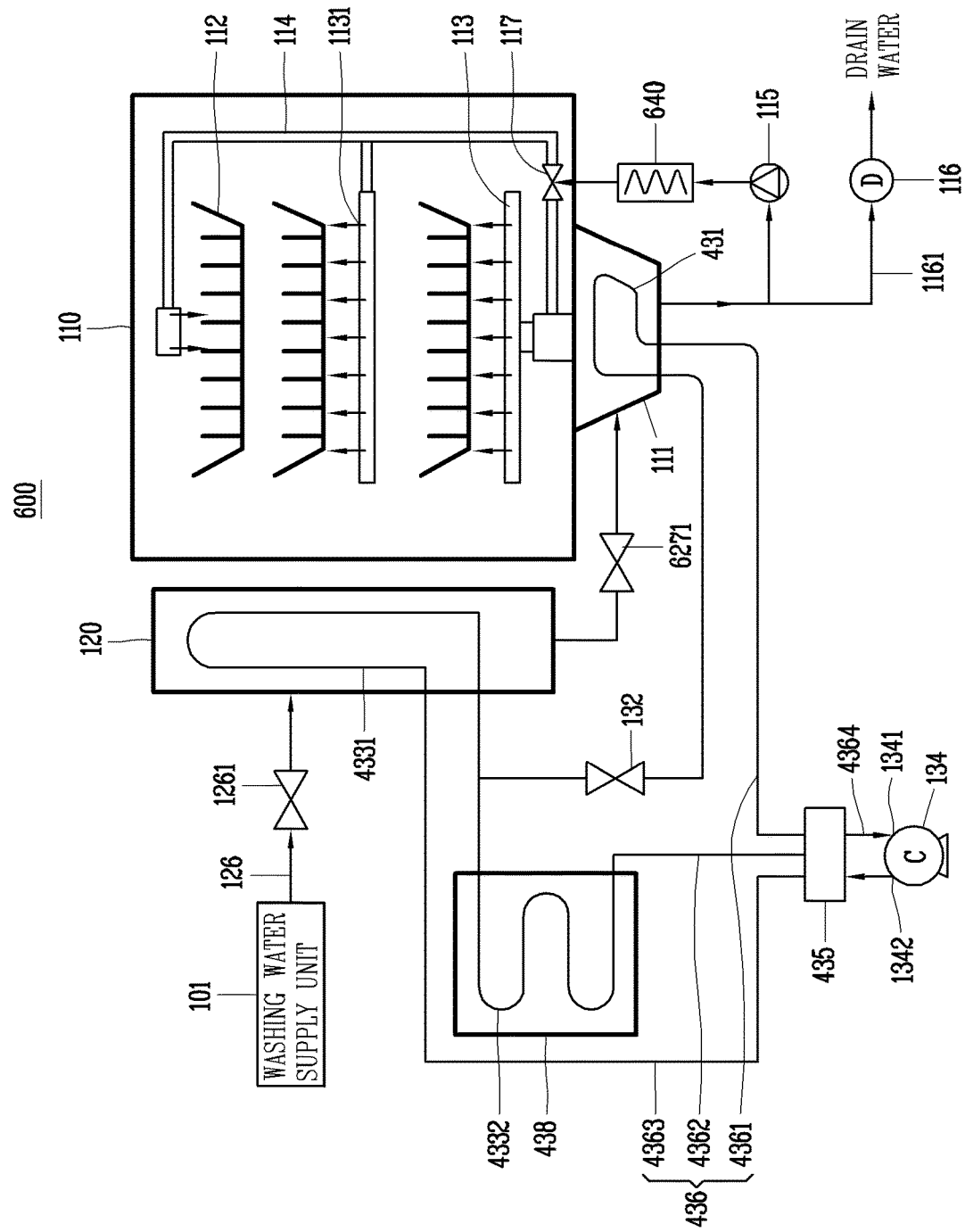
FIG. 9 is a conceptual view showing a dish washer to which a washing water heating and heat recovery system using a mode change in a heat pump according to a sixth embodiment of the present disclosure is applied.

FIG. 9 is a conceptual view showing a dish washer 600 to which a washing water heating and heat recovery system using a mode change of a heat pump according to a sixth embodiment of the present disclosure is applied.

The present embodiment is different from the fourth embodiment in that an electric heater 640 is additionally applied thereto.

The electric heater 640 has a heating coil therein, and when power is applied to the heating coil, the electric heater 640 generates thermal energy to heat washing water passing through the electric heater 240.

The electric heater 640 may be provided in the circulation pipe 114. The electric heater 640 may be disposed at a downstream side of the circulation pump 115, and may be heated by the electric heater 640 prior to distributing washing water discharged from the circulation pump 115 to the injection arm 113.

According to this configuration, the heat exchanger 431 may primarily heat washing water collected in the sump 111, and then the electric heater 640 may secondarily heat the primarily heated washing water, thereby reducing washing water heating time.

Since other components are the same as or similar to those of the first embodiment, their duplicated descriptions will be omitted.

Figure 10:
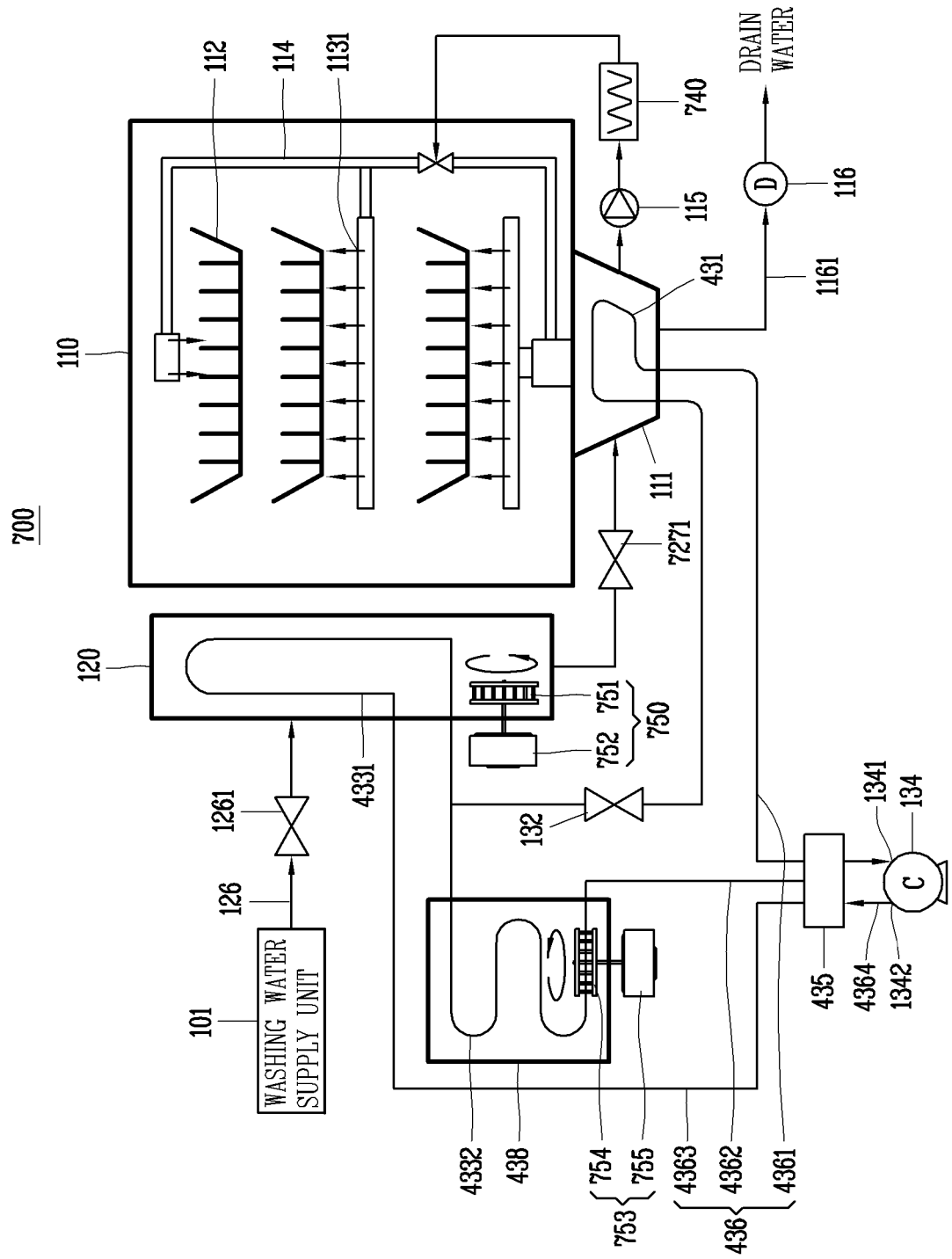
FIG. 10 is a conceptual view showing a dish washer to which a washing water heating and heat recovery system using a mode change in a heat pump according to a seventh embodiment of the present disclosure is applied.

FIG. 10 is a conceptual view showing a dish washer 100 to which a washing water heating and heat recovery system using a mode change of a heat pump according to a seventh embodiment of the present disclosure is applied.

The present embodiment differs from the fourth embodiment in that an electric heater 740 and a flow generator 750, 753 are further included. However, since the electric heater 740 is the same as or similar to that of the sixth embodiment, the description of the electric heater 740 will be replaced with the sixth embodiment.

The flow generator 350 may include a first flow generator 750 disposed in the water storage unit 120, and a second flow generator 753 disposed in the heat exchange chamber 438.

The first flow generator 750 may be configured to generate a flow in the washing water of the water storage unit 120.

The second flow generator 753 may be configured to generate a flow in the washing water of the heat exchange chamber 438.

Each of the first and second flow generators 750, 753 may include an impeller 751, 754 and a drive motor 752, 755. The impeller 751, 754 may be rotatably mounted inside each of the water storage unit 120 and the heat exchange chamber 438.

The drive motor 752,755 may be connected to the impeller 751,754 through a rotary shaft to drive the impeller 751,754.

According to this configuration, heat exchange is more actively carried out between washing water stored in the water storage unit 120 and the refrigerant of the condenser 4331 to increase the condensation temperature of the refrigerant of the condenser 4331, thereby reducing the heating time of washing water.

Figure 11:
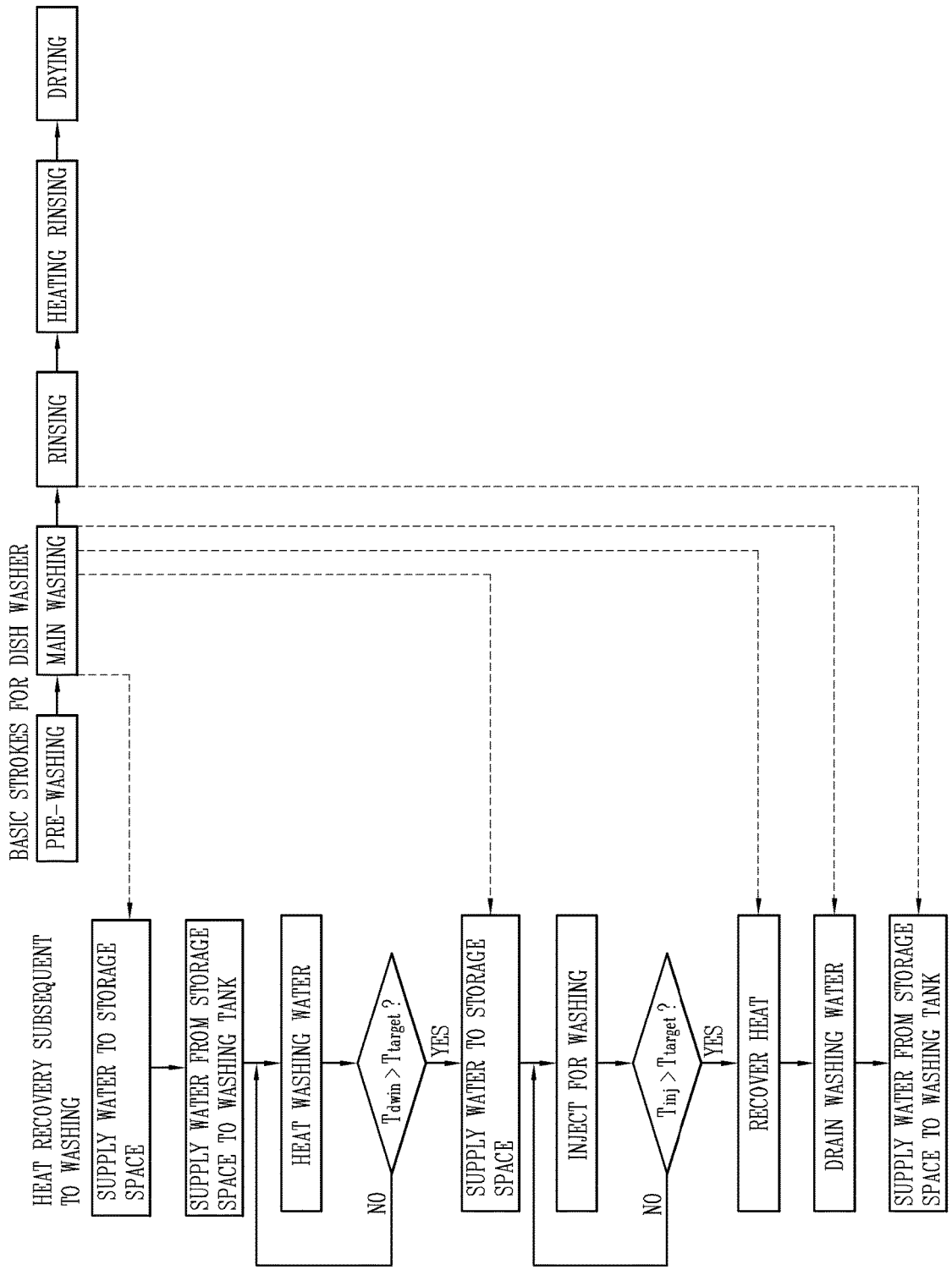
FIG. 11 is a flowchart showing a control method of a dish washer for heat recovery subsequent to washing according to the present disclosure.
Figure 12:
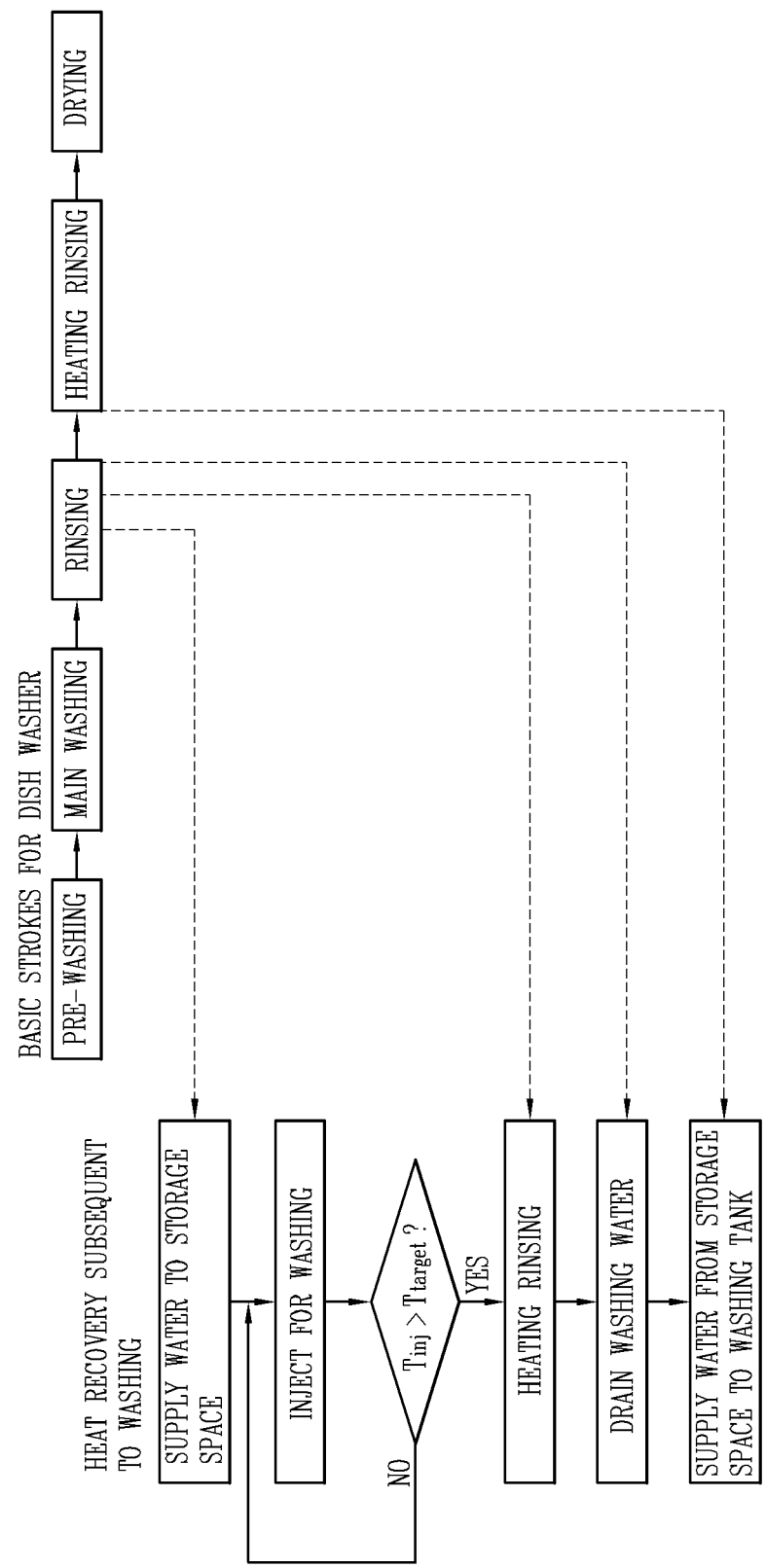
FIG. 12 is a flowchart showing a control method of a dish washer for heat recovery subsequent to rinsing according to the present disclosure.

FIG. 11 is a flowchart showing a control method of a dish washer for heat recovery subsequent to washing according to the present disclosure, and FIG. 12 is a flowchart showing a control method of a dish washer for heat recovery subsequent to rinsing according to the present disclosure.

Basic stroke of the dish washer 100 according to the present disclosure may be carried out in the order of pre-washing, main washing, rinsing, heating rinsing and drying strokes.

Pre-washing denotes injecting washing water without detergent to remove large contaminants on dishes, for example, food leftovers, or the like, and the main washing denotes injecting washing water containing detergent to completely remove contaminants.

Rinsing is to inject washing water so as to remove detergent or the like from dishes, and heating rinsing denotes removing germs or the like that can be sterilized at high temperatures in accordance with the temperature of washing water.

Drying denotes injecting hot air to dry washing water or the like from dishes.

Subsequent to washing dishes, the following process is provided to recover heat from washing water.

First, washing water is supplied to the water storage unit 120 from the washing water supply unit 101. The washing water is transferred from the water storage unit 120 to the washing tank 110.

Next, the washing water collected in the sump 111 is heated by the first heat exchanger 131 (heating mode). The first heat exchanger 131 may receive compressed high-temperature, high-pressure refrigerant from the compressor 134 to heat washing water by exchanging heat between the washing water collected in the sump 111 and the refrigerant.

In the heating mode, the first heat exchanger 131 disposed in the sump 111 may serve as a condenser, and the second heat exchanger 133 disposed in the water storage 120 may serve as an evaporator.

A washing water temperature sensor is provided at the sump 111 to sense a temperature (Tdww) of washing water.

When the washing water temperature is lower than a preset temperature (Ttarget), the washing water is further heated, and when the washing water temperature is higher than or equal to the preset temperature (Tdww>Ttarget), the washing water is supplied to the water storage unit 120.

The washing water heated to the preset temperature may be circulated to the injection arm by the circulation pump 115, and washing water (containing detergent) may be injected onto dishes through the nozzle 1131 of the injection arm to wash the dishes.

The washing water injection time may be set by the user. A UI panel may be provided at a door of the cabinet, and a time may be set through a user control unit on the UI panel.

Washing water may be injected on dishes until the washing water injecting time reaches a preset time.

Subsequently, when washing is completed, heat may be recovered from washing water prior to discharging the washing water from the sump 111 to the outside (heat recovery mode). The first heat exchanger 131 may receive low-temperature, low-pressure refrigerant expanded from the expansion apparatus 132 to exchange heat between the low-temperature refrigerant and the heated washing water to absorb and recover heat from the washing water to the refrigerant.

The first heat exchanger 131 may cool washing water.

In the heat recovery mode, the controller may control the reverse valve 135 to change the flow direction of refrigerant flowing through each of the first heat exchanger 131 and the second heat exchanger 133 in the opposite direction, so that the first heat exchanger 131 can serves as an evaporator, and the second heat exchanger 133 can serve as a condenser.

The washing water may be cooled by the first heat exchanger 131 and then discharged to the outside of the cabinet.

Heat recovered from the washing water may be transferred to the second heat exchanger 133 through refrigerant circulating along the refrigerant circulation pipe 136.

The second heat exchanger 133 may receive high-temperature, high-pressure refrigerant compressed by the compressor 134 to exchange heat between the high-temperature refrigerant and washing water stored in the water supply storage 120, thereby heating the washing water in the water storage unit 120. The heated washing water of the water storage unit 120 may be used as rinsing water.

The rinsing water may be transferred from the water storage unit 120 to the washing tank 110. The rinsing water collected in the sump 111 of the washing tank 110 may be circulated to the injection arm by the circulation pump 115, and injected onto dishes through the nozzle 1131 of the injection arm to rinse the dishes.

Subsequent to rinsing the dishes, the following process is carried out to recover heat from washing water:

A dish washing stroke and a dish rinsing stroke may be carried out independently. For example, dish rinsing is generally carried out subsequent to dish washing, but the user may directly wash dishes and then the dish washer may perform only a rinsing stroke.

Rinsing water may be supplied to the water storage unit 120. The rinsing water may be transferred from the water storage unit 120 to the washing tank 110.

Then, the first heat exchanger 131 disposed in the sump 111 may serve as a condenser to heat the rinsing water collected in the sump 111 (heating mode). The heated rinsing water may be circulated to the injection arm by the circulation pump 115, and injected onto dishes through the nozzle 1131 of the injection arm to rinse the dishes.

In the heating mode, the first heat exchanger 131 may serve as a condenser, and the second heat exchanger 133 may serve as an evaporator.

The rinse water injection time may be set by the user or set to a default value according to a program or stored in the controller.

The rinsing water may be circulated and injected onto dishes until the rinsing water injection time (Tinj) reaches a preset time (Ttarget).

When the injection time of rinsing water is completed (Tinj>Ttarget), the first heat exchanger 131 starts heat recovery from the heated rinsing water. The first heat exchanger 131 may serve as an evaporator to recover heat prior to discharging rinsing water collected in the sump 111.

As the refrigerant flow directions of the first heat exchanger 131 and the second heat exchanger 133 are changed to each other by the reverse valve 135 in the heat recovery mode, the first heat exchanger 131 may serve as an evaporator, and the second heat exchanger 133 may serve as a condenser.

The first heat exchanger 131 may cool rinsing water by absorbing heat from the rinsing water.

The first heat exchanger 131 may transfer the heat recovered from the rinsing water to the second heat exchanger 133 by refrigerant circulating along the refrigerant circulation pipe 136.

The second heat exchanger 133 may exchange heat between high-temperature, high-pressure refrigerant compressed by the compressor 134 and rinsing water stored in the water storage unit 120 to heat the rinsing water.

The controller may control the drain pump to drain the cooled rinsing water to the outside.

The heated rinsing water may be transferred from the water storage unit 120 to the washing tank 110.

Subsequently, the heated rinsing water may be collected in the sump 111, and circulated by the circulation pump 115 into the injection arm, and injected onto dishes through the nozzle 1131 of the injection arm to rinse the dishes during the heating rinsing.

According to a method of controlling the foregoing dish washer, a method of heating washing water or rinsing water using a mode change in the first heat exchanger 131 and the second heat exchanger 133 and then recovering heat from washing water or the like according to the first embodiment has been described, but heat may be recovered from washing water or the like subsequent to heating washing water or rinsing water using a mode change in the heat exchanger (heating mode) and the evaporator or the heat exchanger (heat recovery mode) and the condenser according to the fourth embodiment.

Therefore, according to the present disclosure, the first heat exchanger 131 (heat recovery mode) may change the mode from the heating mode to the heat recovery mode, subsequent to washing dishes using washing water heated by the first heat exchanger 131 (heating mode) prior to draining the heated washing water, to recover heat from the washing water by the first heat exchanger 131 thereby minimizing energy loss caused by discarding the existing heated washing water to save energy.

In addition, in the heat recovery mode, the heat recovered from the washing water by the first heat exchanger 131 may be transferred to the second heat exchanger 133 to allow the second heat exchanger 133 to preheat the washing water stored in the water storage unit 120, thereby reducing washing water heating time.

Moreover, washing water heated by the second heat exchanger 133 (heat recovery mode) subsequent to draining the washing water may be transferred to the washing tank 110, and used as rinsing water during the rinsing or heating rinsing stroke.

What is claimed is:

1. A dish washer, comprising:
    a washing tank that defines an accommodation space therein configured to receive one or more objects to be washed, the washing tank comprising a sump disposed at a bottom surface of the washing tank;
    a water storage unit disposed at a side of the washing tank and configured to store washing water to be supplied to the washing tank;
    a heat pump system configured to circulate refrigerant, the heat pump system comprising a compressor configured to compress the refrigerant, a first heat exchanger disposed in the sump, an expansion apparatus, and a second heat exchanger, the second heat exchanger being disposed in the water storage unit and configured to heat washing water for washing the one or more objects;
    a reverse valve that connects the compressor to each of the first and second heat exchangers, the reverse valve being configured to change a flow direction of refrigerant in the first heat exchanger and the second heat exchanger;
    a temperature sensor provided at the sump and configured to sense a temperature of washing water in the sump; and
    a controller configured to control the reverse valve,
    wherein the first heat exchanger and the second heat exchanger are configured to, based on the flow direction of refrigerant, switch between a heating mode for heating washing water in the sump and a heat recovery mode for recovering heat from washing water discharged from the washing tank to an outside of the washing tank,
    wherein the controller is configured to, in the heating mode, supply washing water from the sump to the water storage unit based on the temperature of washing water being greater than or equal to a preset temperature,
    wherein the water storage unit includes:
        a water inlet disposed at an upper portion of the water storage unit,
        a water outlet disposed at a lower portion of the water storage unit,
        a suction port disposed at a first side of the water storage unit,
        a discharge port disposed at a second side of the water storage unit, the second side facing the first side and being opposite to the first side, and
        a plurality of guide walls that are disposed inside the water storage unit and spaced apart from one another, and
    wherein the second heat exchanger comprises a refrigerant pipe that extends between the plurality of guide walls.

2. The dish washer of claim 1, wherein the first heat exchanger is configured to:
    in the heating mode, release heat to washing water by condensing the refrigerant in the first heat exchanger in a state in which the refrigerant is circulated in a first flow direction through the first heat exchanger, the expansion apparatus, the second heat exchanger, and the compressor; and
    in the heat recovery mode, absorb heat from washing water by evaporating the refrigerant in the first heat exchanger in a state in which the refrigerant is circulated in a second flow direction through the first heat exchanger, the compressor, the second heat exchanger, and the expansion apparatus.

3. The dish washer of claim 2, wherein the controller is configured to control the reverse valve to switch the flow direction of refrigerant between the first flow direction and the second flow direction.

4. The dish washer of claim 1, further comprising:
    a washing water supply unit configured to supply washing water to the water storage unit;
    an inlet pipe that connects the washing water supply unit to the water storage unit;
    a water inlet valve disposed at the inlet pipe and configured to open and close the inlet pipe;
    a washing water connection pipe that connects the water storage unit to the sump; and
    an open-close valve configured to open and close the washing water connection pipe.

5. The dish washer of claim 1, wherein the refrigerant pipe of the second heat exchanger has a circular pipe shape and defines a serpentine shape extending toward one side of the water storage unit and another side of the water storage unit.

6. The dish washer of claim 5, further comprising:
    wherein the plurality of guide walls are configured to guide air flow introduced into the water storage unit, and
    wherein each of the plurality of guide walls defines a communication hole disposed at one end portion and is configured to guide the air flow inside the water storage unit through the communication hole.

7. The dish washer of claim 6, wherein a flow direction of the air flow inside the water storage unit along the plurality of guide walls is opposite to the flow direction of refrigerant in the second heat exchanger.

8. The dish washer of claim 1, further comprising:
    a plurality of racks disposed inside the washing tank and configured to support the one or more objects;
    a plurality of injection arms disposed inside the washing tank and spaced apart from each other in a vertical direction, the plurality of injection arms comprising a plurality of nozzles configured to inject washing water toward the one or more objects;
    a circulation pump configured to circulate washing water discharged from the sump into the plurality of injection arms; and
    a drain pump configured to discharge washing water discharged from the sump to the outside of the washing tank.

9. The dish washer of claim 8, further comprising:
    an electric heater configured to heat washing water discharged from the sump to provide heated washing water to the plurality of injection arms.

10. The dish washer of claim 1, further comprising:
a flow generator configured to generate a flow of washing water stored inside the water storage unit, the flow generator comprising an impeller rotatably mounted inside the water storage unit and a drive motor configured to drive the impeller.

11. The dish washer of claim 1, further comprising a first plurality of refrigerant circulation pipes that connect the reverse valve to the compressor.

12. The dish washer of claim 11, further comprising a second plurality of refrigerant circulation pipes that connect the reverse valve to the first and second heat exchangers, respectively.

13. The dish washer of claim 1, further comprising:
a first refrigerant circulation pipe that connects the reverse valve to the first heat exchanger;
a second refrigerant circulation pipe that connects the reverse valve to the second heat exchanger;
a third refrigerant circulation pipe that connects the reverse valve to an inlet port of the compressor; and
a fourth refrigerant circulation pipe that connects the reverse valve to an outlet port of the compressor.

14. The dish washer of claim 1, wherein the compressor has an inlet port and an outlet port that are connected to each other through the reverse valve.

15. The dish washer of claim 1, wherein the reverse valve is located between the compressor and the first and second heat exchangers and connected to the first and second heat exchangers, an inlet port of the compressor, and an outlet port of the compressor.

16. The dish washer of claim 1, wherein the water storage unit has a rectangular shape,
wherein the water outlet is spaced apart from the water inlet in a diagonal direction of the rectangular shape,
wherein the suction port is disposed adjacent to the water outlet in a left and right direction,
wherein the discharge port is disposed adjacent to the water inlet in the left and right direction, and
wherein the plurality of guide walls extend in a vertical direction and are spaced apart from each other in the left and right direction.

17. The dish washer of claim 1, further comprising:
a suction fan configured to suction outside air through the suction port; and
a plurality of communication holes alternately arranged in a zigzag fashion at ends of the plurality of guide walls,
wherein the refrigerant pipe of the second heat exchanger has a serpentine shape extending vertically between the plurality of guide walls.

18. The dish washer of claim 1, further comprising a suction fan configured to blow outside air to the suction port,
wherein the plurality of guide walls comprise:
first guide walls that extend downward from an upper side of the water storage unit; and
at least one second guide wall that extends upward from a lower side of the water storage unit and is disposed between the first guide walls,
wherein the first guide walls and the at least one second guide wall are spaced apart from each other in a horizontal direction and alternately arranged along the horizontal direction,
wherein the water storage unit further includes a plurality of communication holes that are arranged between the upper side or the lower side and ends of the plurality of guide walls, and
wherein the refrigerant pipe of the second heat exchanger has a serpentine shape that extends in a vertical direction between the plurality of guide walls and that is curved around the ends of the plurality of guide walls.

19. The dish washer of claim 1, wherein the water storage unit has a rectangular shape having the first side, the second side, a third side that connects upper ends of the first and second sides, and a fourth side that faces the third side and connects lower ends of the first and the second sides,
wherein the suction port is disposed at an upper part of the first side, and the water outlet is disposed at a lower part of the first side, and
wherein the water inlet is disposed at the third side.

20. The dish washer of claim 1, wherein the suction port is disposed at an upper part of the first side, and the water outlet is disposed at a lower part of the first side.

* * * * *